July 17, 1962   W. J. PARKS   3,044,624
SCREENING MACHINE AND RUBBER MOUNTING UNIT THEREFOR
Filed Jan. 8, 1958   4 Sheets-Sheet 1

INVENTOR.
WALTER J. PARKS
BY
Fay & Fay
ATTORNEYS

INVENTOR.
WALTER J. PARKS
BY
*Fay & Fay*
ATTORNEYS

July 17, 1962 W. J. PARKS 3,044,624
SCREENING MACHINE AND RUBBER MOUNTING UNIT THEREFOR
Filed Jan. 8, 1958 4 Sheets-Sheet 3

INVENTOR.
WALTER J. PARKS
BY
*Fay & Fay*
ATTORNEYS

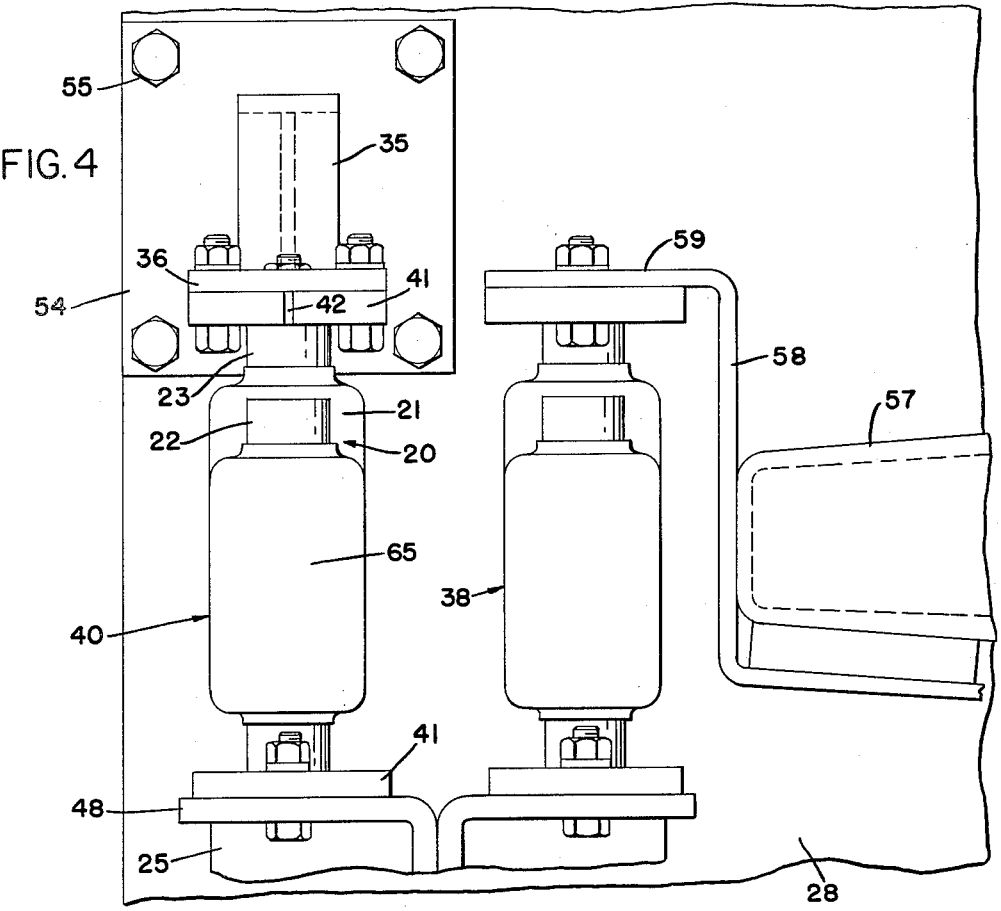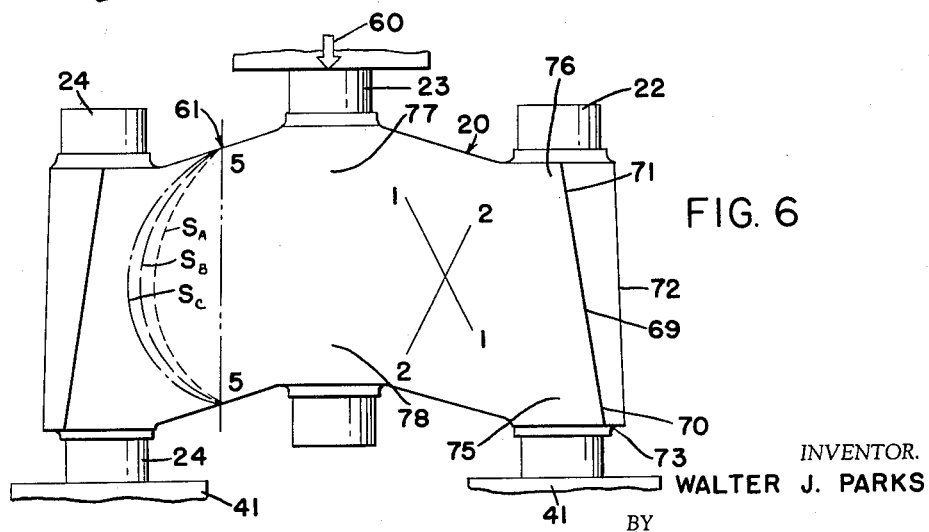

United States Patent Office 3,044,624
Patented July 17, 1962

3,044,624
SCREENING MACHINE AND RUBBER MOUNTING UNIT THEREFOR
Walter J. Parks, Cleveland, Ohio, assignor to The W. S. Tyler Company, Cleveland, Ohio, a corporation of Ohio
Filed Jan. 8, 1958, Ser. No. 707,777
6 Claims. (Cl. 209—412)

This application, relating as indicated to a screening machine and rubber mounting unit therefor, is particularly directed to a gyratory type of screening machine wherein the gyrating screen body is mounted or stabilized by means of rubber mounting units.

These screening machines may be of the general type described in Parks Patent No. 2,212,550, but are not necessarily limited thereto. In connection with these screening machines, a particular form of rubber mounting unit has been developed with improved performance. These rubber mounting units are characterized in a simple form as having at least one tubular support between two adjacent and similar members, with blocks of rubber in a chevron shape surrounding the multiple support members.

The principal characteristic of these rubber support elements is that a given applied load is transferred from one tubular element to another by means of a block of rubber, which thereby is stressed in shear but also in which the stress distribution over a given cross-sectional area is advantageously controlled by the shape of the tubular elements and also by the fact that a portion of the rubber block acts as a yielding abutment at the points adjacent to the tubular elements to reduce the stresses in the main block of rubber on the outside faces.

These rubber mounting units are designed to give a larger deflection under a given load than designs heretofore available, i.e., the spring rate or pounds per inch deflection would be lower than that obtainable by conventional designs and increase the stability of the rubber components under heavy and continuous loading at fairly high frequency, as, for example, 1,000 cycles per minute and up in operation.

This invention is further directed to the screening machine and the resilient rubber mounting means further to be described in connection therewith and has, as mentioned above, as one of its objects to increase the stability of the rubber mounting units, particularly in connection with vibrating screens but useful in other connections, by reducing the length of a substantial portion of the rubber support element between the metallic or tubular supports and lengthening other portions of the rubber support element so that increased flexibility is obtained without impairing the stability of the rubber element. That is to say, there is a reduced length of the rubber element between the curved portions of a tubular support element but an increased length between the sides on a line where a tangent may be drawn between two tubular support means.

An object of this invention is to produce a new and improved gyratory screen device having resilient supporting components which are capable of supporting a vertical component of load, such as the weight of the screen units, and at the same time allowing vibrational movement in the desired plane of operation. The resilient components are designed so that there is the proper deflection for the unit, i.e., the spring rate is of the correct and desired order of magnitude. It is known that the spring rate is a function of the cross-sectional area between the components and the modulus of the rubber and an inverse function of the thickness or length of the components. It will be seen that it is necessary to arrange the size of the cross-sectional area of the rubber and the length of the rubber components to obtain the desired spring rate. In previous designs where low spring rates demanded a small cross section, compared to the length of the resilient components, an unstable condition would exist in the resilient unit.

A further object of this invention is to provide a new and improved resilient mounting particularly for a vibrating screen of the gyratory type in which there is greater stability for large deflections and providing for yieldable abutments with a number of tubular support members.

A further object of this invention is to provide a resilient mounting incorporating tubular elements in a block of elastomeric materials, said elastomeric material surrounding each of the tubular elements on the outer sides thereof and providing an abutting wall of elastomeric material on either side of the tubular elements.

A further object of this invention is to provide a resilient mounting incorporating a mass of rubber between two abutments in the form of tubular components, whereby, under load, the rubber is more highly stressed at the minimum distance between abutments, and other portions of the rubber outwardly therefrom are less highly stressed with the lowest stress being in the zone or band of rubber surrounding the components and outwardly of a tangent line joining the tubular elements.

A further object of this invention is to provide a new and improved resilient mounting in which an elastomeric or rubber support member surrounds each of a pair of complementary tubular supports, said elastomeric material outwardly thereof being of lower stress concentration to aid in supporting the more highly stressed material between the tubular components.

A further object of this invention is to provide a new and improved resilient support member, particularly of elastomeric material, adapted to support a load in the vertical plane and comprising a single tubular support member and a further pair or set of tubular support members outwardly disposed therefrom, one of said member or members being loaded relative to the other member or members. In this manner a load may be supported in a vertical direction and at the same time vibrational movement accommodated in planes in a desired direction.

A further object of this invention is to provide a new and improved elastomeric support element in the form of a chevron, incorporating at least three tubular support elements, said resilient mounting having a mass of rubber between the curved tubular support surfaces and a layer of rubber outwardly disposed therefrom which, when load is applied, has a lower stress concentration to support and retain the more highly stressed rubber between the tubular supports, said rubber surrounding the outer tubular supports and providing a yieldable abutment for a load.

To the accomplishment of the foregoing and related ends, said invention then consists of the means hereinafter fully described and particularly pointed out in the claims; the following description setting forth in detail one approved means of carrying out the invention, such disclosed means constituting but one of the various ways in which the principles of the invention may be used.

In the drawings:

FIG. 4 is an enlarged fragmentary side view of the support elements of this invention;

FIG. 6 is a view of the elastomeric support element in a loaded condition, showing the movement of the rubber under stress and including the yieldable displacement and rotational movement of the rubber in the abutment around the tubular element.

In connection with this invention, it will be seen that reference is made to rubber and elastomers and, in particular, elastomeric materials. Elastomer and elastomeric materials are meant to refer to rubber, natural rubber and a variety of synthetic rubbers, consistent with the proper modulus for this invention and its operating characteristics. By elastomer it is also meant any rubber-like polymeric material, including natural caoutchouc, as well as synthetic rubbers and rubber-like materials, such as neoprene and butyl rubber, but not necessarily limited thereto. Where I refer to rubber in connection with this invention, I mean elastomeric materials, and where I refer to tubular supports, I mean both hollow and solid tubular supports of varying exterior surfaces, preferably curved surfaces, as, for example, a cylindrical support element.

Figure 1:
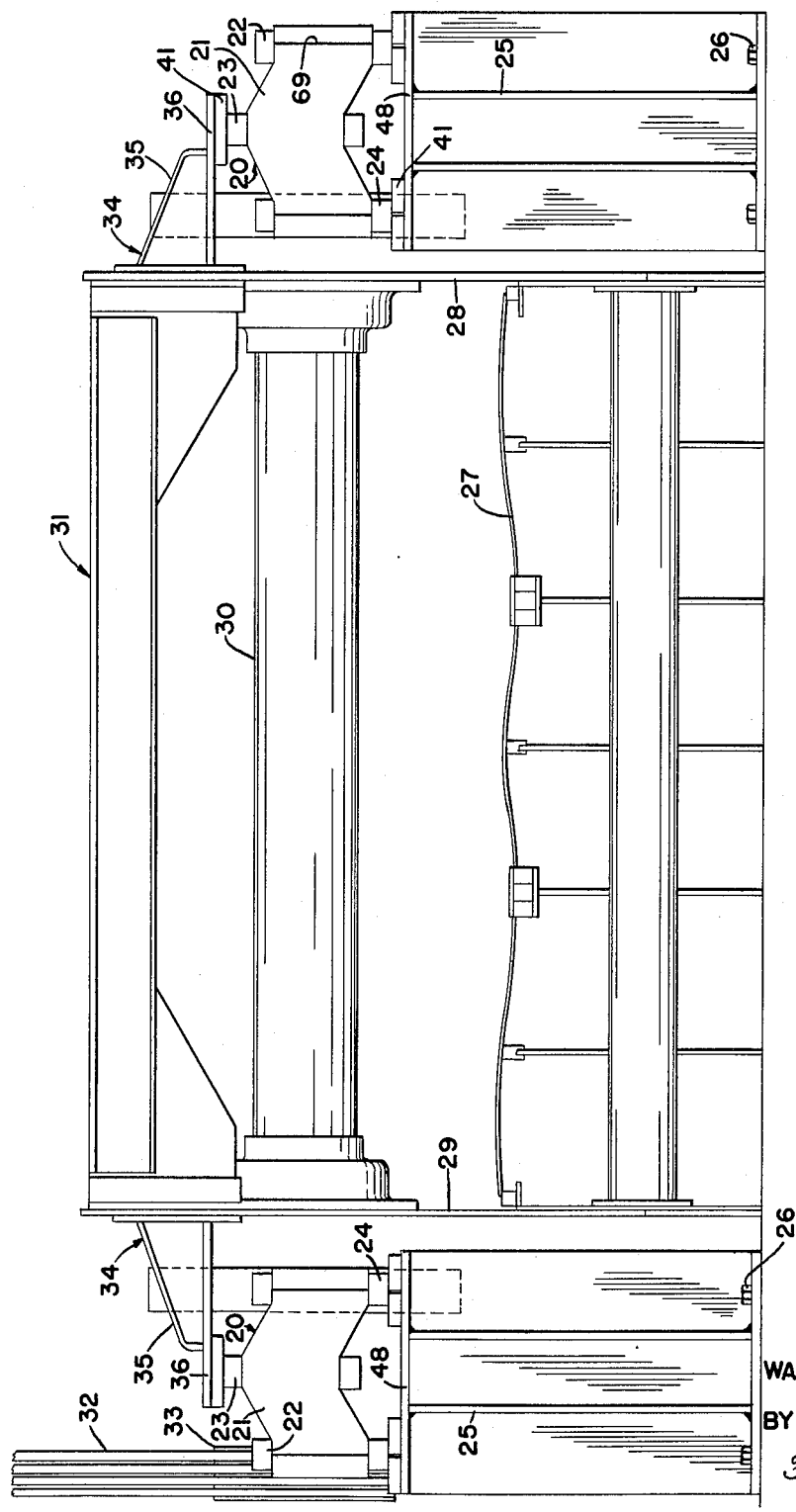
FIG. 1 is an end view of my new and improved gyratory screening apparatus.

In the drawings, FIG. 1 shows an end view of a vibrating screening apparatus of the gyratory type in which the elastomeric support element is shown at 20 and is formed of a mass of elastomer or rubber 21 in the shape of a chevron, having securely bonded therein a plurality of tubular supports or pipes, the outer one of which is shown at 22, the center support for the load at 23 and the inner support at 24. The opposite units are identical with respect to this. The unit is mounted on a pedestal 48 having vertical support plates 25 therefor and means 26 for mounting to a suitable stationary support or base frame. At least one screen deck 27 is secured to the apparatus between side frame members 28 and 29 which additionally are connected to tubular means 30 in which is secured the vibrating apparatus. Upper brace means is shown generally at 31, and the vibrating apparatus is driven by means of a drive belt 32 to a pulley 33, or some equivalent means. A framing structure indicated generally at 34 comprises an upper base member 35, a support member 36 and means to be fully described later for gripping the internal side of the tubular supports.

Figure 2:
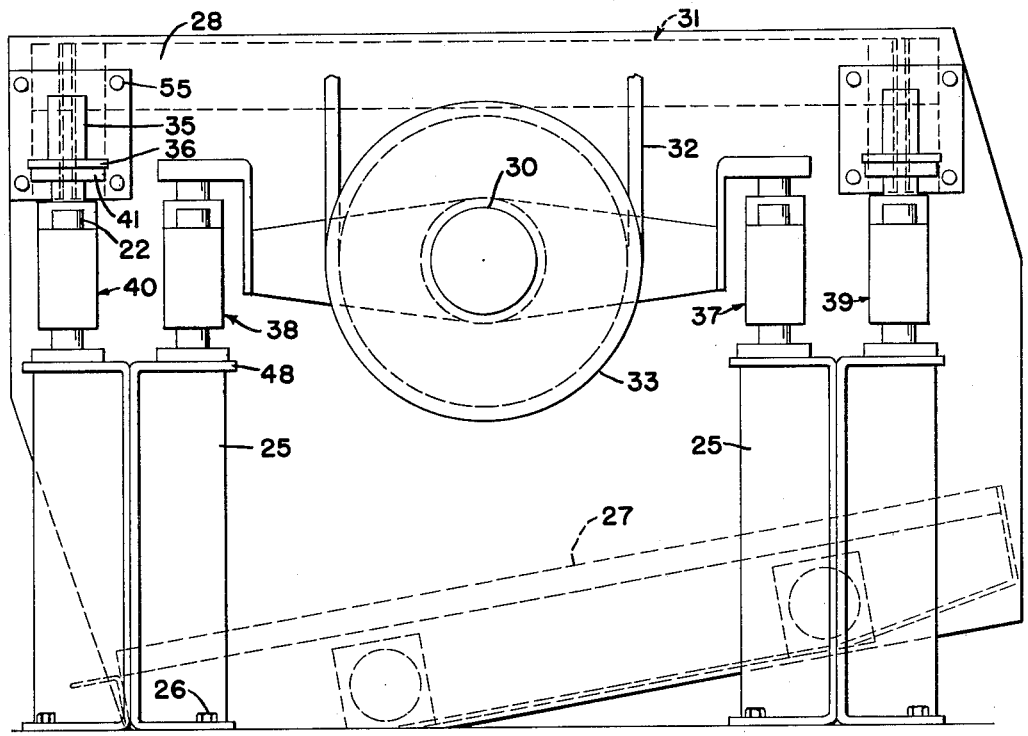
FIG. 2 is a side view of said apparatus.

FIG. 2 shows a side view of this apparatus with a plurality of resilient support elements 39 and 40, particularly seen in connection with FIG. 4. Additionally inner support elements are indicated generally at 37 and 38, providing means for resiliently mounting the balancing member 57. All of the resilient members, 37, 38, 39 and 40, act together to support the weight of the screen body, composed of elements as previously enumerated, and the weight of the vibration producing mechanism. In the type shown this vibration producing mechanism would be as shown and described in Parks Patent No. 2,212,550. Therefore, the relative motions of the screen body and the balancing member 57 would produce in their attached resilient mounting members a displacement which would be 180° out of phase so that the reactions on their supporting members would balance each other and so prevent vibration being transmitted to the supporting structure or base frame.

Figure 3:
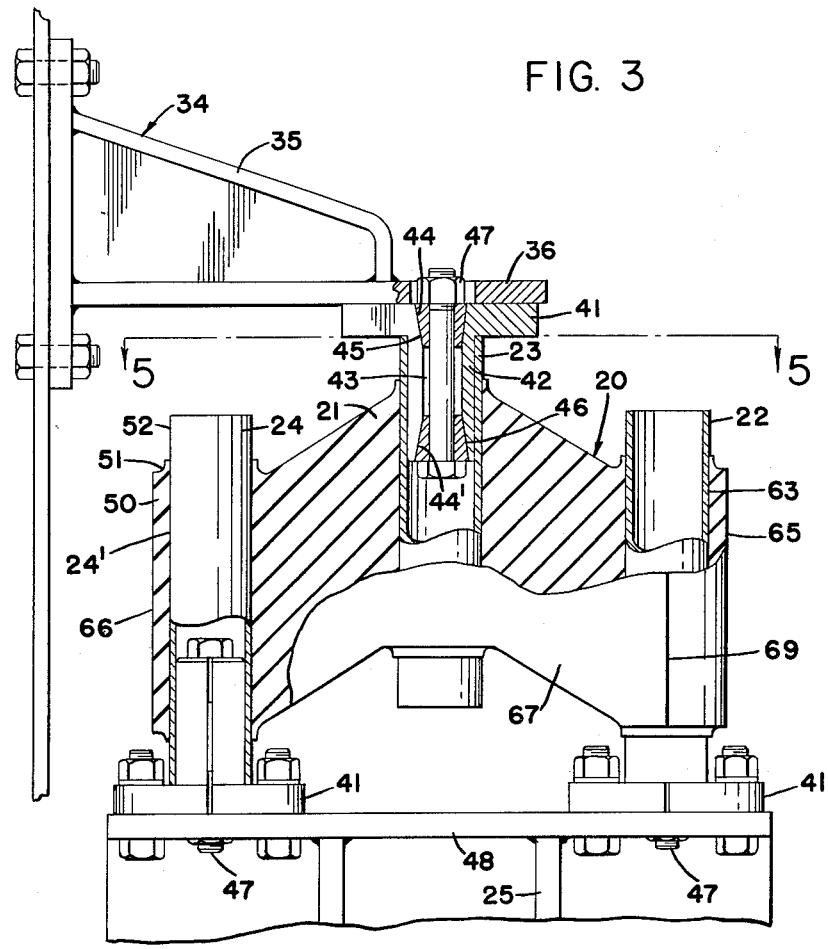
FIG. 3 is a view partially in cross-section of one of the supports for the apparatus, incorporating the novel resilient elastomeric support element of this invention.

Further in connection with the details of the screen body supporting unit, the angular support for this elastomeric unit is indicated at 34 in FIG. 3, having the angle brace member 35. A mounting plate or bracket to support the unit is shown at 36. The tubular elements are indicated generally at 22 on the right, 23 in the center and 24 on the left. These are hollow elements, though solid elements of slightly varying cross section, such as ellipsoidal, could be used under certain conditions. The pedestal support means is indicated at 48 having various types of bracing elements 25. A particular type of clamping element to rigidly join the tubular elements and the support element is devised in which a split cap member indicated at 41 has a central section 42 adapted to fit within the tubular element. In this area is a central cylindrical surface 43 and two conically tapered surfaces, tapered in the opposite direction and indicated at 44 and 44'. Two conically shaped bushings are indicated at 45 at the top and 46 at the bottom. A threaded connector bolt 47 is secured therebetween adapted to force each conical bushing against its conical seat in the support element. The expansion of the split cap member caused by the wedge action of the conical bushings is adapted to tighten the connector onto the tubular element. In this manner loads, i.e., the weight of the screening apparatus or vibratory motion of its elements, can be transferred to the elastomeric support element 20 and deflect it as is shown in connection with FIG. 6, or as may otherwise be necessary without relative motion of the tubular and support elements. The lower elements for gripping the tubular element are of substantially similar construction and will not be described here in greater detail.

Further in connection with FIG. 3, it will be seen that the central tubular support element or pipe 23 is spaced upwardly with respect to the outside tubular support elements 22 and 24, with the connecting rubber or elastomeric material forming a chevron shaped body so that it may take a very large deflection before its bottom surface comes to the same elevation as the other tubular elements. The tubular elements, being embedded in the rubber, produce a structure having for tubular element 24 a wall or layer of rubber 50 firmly bonded to the tube to completely surround it. The main body of the rubber surrounding tubular element 24' is also extended upwardly from the top surface in the form of a fillet or feathered edge 51. It will be seen that only a small surface indicated at 52, of which there is a comparable surface on each end of all the tubular elements, will be exposed to corrosion and other destructive forces. Under certain adverse atmospheric conditions these would be sealed or protected in various ways. The feathered edge 51 from the surface of the main rubber body to the tubular element also gradually reduces the stress at this transition point so that there is a very much reduced chance of tearing away of the elastomeric material from the tubular element, with its subsequent deterioration and destruction. This results in an improved life expectancy for the resilient mounting in operation.

Figure 5:
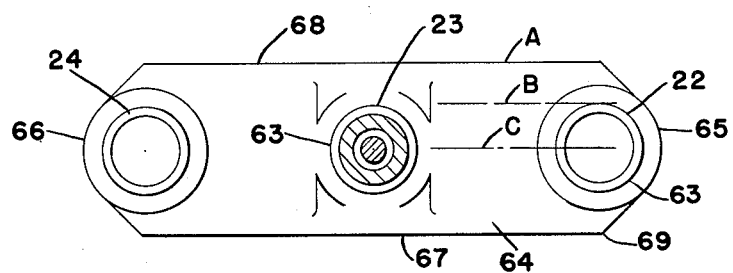
FIG. 5 is a top view of the elastomeric support element along the line 5—5 of FIG. 3.

FIGS. 4, 5 and 6 show further details of this system. The connector, above described, is shown generally at 54 having a plurality of means indicated at 55 for securing to the side frame element 28, and the various supporting elements 35 are shown in connection with these views. The tubular element 22 is seen here as well as the central tubular support element 23, which is secured to the base plate 36 with the split connector 41 and 42.

In FIG. 4 the resilient support element 38 for the balancing element is seen adjacent to the resilient support element 40 for the screen body. The balancing element has a lateral connecting element 57 attached to a vertical element 58 to a flanged or horizontal element 59, which, in turn, is connected by means of a similar internal connecting device, such as a split connector, to the central tubular support element of the elastomeric support and operates in substantially the same manner being adapted to take a vertical load, and is also adapted to vibrate or gyrate in a plane substantially perpendicular to the center line through all tubular elements. Both of these support elements are mounted on a common pedestal in connection with this screening device.

The change in shape due to the displacement of the rubber under load is seen particularly in connection with FIG. 6, where a load indicated by an arrow at 60 has caused a deflection in the chevron shaped elastomeric support element 20. The deflection is particularly noticeable in the section 61 between support elements 23 in the center and 22 and 24 on either side. This is particularly seen in connection with FIG. 5 where the tubular elements are shown, and the more highly stressed zone would be indicated at the minimal distance between the pipe to the exterior diameter of support 23 as, for example, at 63. It will be seen that each filament of rubber between the tubular elements will be longer as it proceeds around the curved surfaces, and will be maximum at the tangent to the tubular supports. The wall of rubber or zone of rubber indicated at 64 surrounding the tubular elements and on the outer sides as, for example, at 65 and 66, will be relatively unstressed and will provide for a support element for the more highly stressed sections.

In FIG. 5 the point marking the junction of the parallel side walls indicated at 67 and 68 with the curved end walls 65 and 66 will be a relatively sharp line indicated at 69. This is shown as a line in FIG. 6 and under load this junction, which was vertical, as particularly seen in FIGS. 3 and 5, has now been sloped outwardly at the bottom as at 70 and slightly inwardly at the top as at 71. This shows the action which takes place in connection with the unit, wherein the rubber in the zone or area around the support elements yields providing what will be hereinafter designated as a yieldable abutment and provides for rubber shifting around the lower portion of the tubular support element 22 as, for example, in the lower section as indicated at 72 to the feathered edge portion indicated at 73. It further will be appreciated that this deflection of the unit will cause a general expansion of the slab or elastomeric material in the vicinity of the lower portion of tube 22 as at 75, a slight contraction in the upper portion of the tube as at 76 and substantially no change in the center portion shown at 77, wtih a very slight enlargement to be described in greater detail in connection with the examples as at 78. The tubular element 24 will be substantially like tubular element 22.

To understand in greater detail the principal embodiments of this invention with respect to the drawings, I wish to point out the following single example: FIGS. 1, 3 and 6 show an operative embodiment in which a slab of rubber 3½" x 6" high in cross section is employed in a chevron shape, the chevron forming an included angle of about 120°. Three tubular pipe elements with an outside diameter of about 1⅞" are bonded therein with a wall of rubber surrounding the outside pipes. The rubber thickness between the tubular support elements at the center line is about 3¼". This is capable of large deflections under a given load so that the spring rate or pounds per inch deflection would be considerably lower than with conventional designs having a 3¼" thickness between backing plates. This unit is particularly adapted to operate over a wide range of frequencies and in the type of machine illustrated would normally be used in the range of 700 to 1200 cycles per minute. It has been found that the rubber at the upper ends of the outer tubular support elements contracts slightly with deflection, as, for example, a 1" deflection of the unit will shrink in width perhaps 9/64 of an inch. The center, however, instead of contracting, expands by about 5/32 of an inch. The bottom on the outer members expands 7/32 of an inch, and the center member at the bottom is substantially unchanged. It further will be noted, as shown in the drawings at 69, that the rubber around the outside of the tubular elements provides a yieldable abutment in that the line marking the junction of the outside layer of rubber and the side wall rotates or moves around the original position when it is loaded as shown, thus providing a yielding abutment, and this line is shown in FIG. 6. These units are particularly adapted to carry a heavy load, such as a gravity load, in a direction parallel to the axis of the tubular elements and at the same time permit a vibrational type of movement of considerable magnitude particularly in a vertical plane perpendicular to the plane through the center lines of the tubular elements. That is to say, they are adapted to be mounted perpendicular to the longitudinal side of a conventional vibrating screen and to support the vertical component of load, with a shear displacement of the chevron shaped mounting block and at the same time permit vibrations in the plane perpendicular to the plane of the mounting block and along the length of the screen. It may readily be seen that in this unit the total deflection for a given load in a direction perpendicular to the axis of the tubular elements will be greater than the deflection for the same load parallel to the axis because of an additional torsional and bending deflection of the rubber. This does not affect the operation of the unit or impair its efficiency in use, such as supporting vibrating equipment, as the greater magnitude of load in these cases is applied substantially parallel to the axis of support for maximum load carrying ability. It is true that the unit may be mounted other than substantially perpendicular to the horizontal and in certain inclined screen application where the axes of the units are not vertical, this inclination of the axis will throw a component of the load in a plane perpendicular to the plane through the axes, and increases the deflection in this direction, but this component is usually small and the unit is capable of accepting this component of load, i.e., special arrangements need not be made in connection with inclined screening apparatus to have the unit always perpendicular to its supporting frame but it may be inclined and still give satisfactory results.

One of the basic concepts of this invention is to produce a resilient supporting unit wherein increased flexibility is obtained by using an extra long rubber element between supporting points and stability is retained by using a particular shape of supporting element whereby some of the rubber elements are substantially reduced in length. This reduction in length of the elements increases the stresses therein under a given load. But the design is such that there is also provided a surrounding volume of substantially less stressed rubber which protects them from premature failure. Therefore, it is pertinent to give an example of this variation in stress over a given cross-sectional area of such a unit.

The unit selected for this test was first loaded in a compression testing machine to a deflection of 1½" for a load of 1160 pounds. The average spring rate for this deflection would therefore be 773 pounds per inch of deflection. At this deflection the deformations were measured at the surface, plane A, and also on a plane B tangent to the surface of the tubular elements.

By means of standard stress analysis procedures, the shearing stresses and the stresses normal to the shearing stresses on a plane 5—5, which is perpendicular to the above mentioned planes and parallel to the axes of the tubular elements, were determined. These stresses have been plotted in FIG. 6. The applied load as calculated from these determinations was 1112 pounds, a difference of only 4% from the actual load.

It can be seen from the plot of the shearing stresses that the stresses $S_A$ at the surface of the unit are less than the stresses $S_B$ at the plane tangent to the surfaces of the tubular element. While stresses were not specifically calculated for the plane passing through the center line of the tubular element, by assuming parabolic distribution of stresses on a plane perpendicular to the above mentioned planes, it can be determined that the shearing stresses at the center of the unit, plane C, (see FIG. 5), would be about 40% higher than at the surface of the unit.

The actual load carrying capacity of the unit is greater than the theoretical load carrying capacity. This is due to the outside tubular elements being restrained at the top and botom, which for he chevron shaped rubber element, loaded as shown, causes a compression of the rubber element in the direction 1—1 and a tension of the rubber element in the direction 2—2 in FIG. 6.

A visual observation of the deformations at the top and bottom, which for the chevron shaped rubber element, sive deformation on the plane through the center line of the tubular elements than on other planes outwardly therefrom to each face. This is due to a change from a rigid backing face to the yielding abutment restraining area.

The stress patterns, as indicated, in general are additionally influenced in local areas at the intersection of the rubber with the tubular elements at the top and bottom of the chevron with further reduction in stress at these points making a more durable unit.

Further in connection with this invention, it will be seen that this invention accomplishes a better bond between the steel and the elastomeric part, and a bond which has no particular weak spots between the elastomeric part and all of the steel parts. Furthermore, the bond produced by vulcanization of the rubber to the steel is reinforced mechanically by the shrinkage of the rubber around the tube perimeter during this curing operation. This construction also gives a minimum of exposed perimeter at the junction of the tubular elements and the elastomeric material, which is important inasmuch as most all bond failures start at this point and the less the length, the less possibility of failure.

Units presently in test use standard steel pipes for the tubular elements, thus materially holding tooling costs down and the unit can be easily manufactured with more uniform cure during vulcanization, thus producing a more economical, uniform and dependable component. It is further apparent that there is less acute bulging or displacement in segments of the elastomeric support element or mounting than in present conventional designs. This reduced bulging results in a reduced stress upon the elastomeric material at the junction with the steel or tubular part. All of these advantages and objects are obtained even with relatively large deflections and also with good stability in the components.

It will be seen that any load, as seen particularly in connection with FIG. 6, along the axis of the tubular support will produce principally a shear displacement of the rubber or elastomeric material. It will also, however, cause some other stresses in the elastomeric elements between the tubular components unless the outer members are free to move inwardly which is generally prevented by the relatively rigid mounting of the unit. These secondary stresses may be either compression or tension. The compression forces definitely add to the strength of the unit, particularly at the bond between the tubular steel parts and the rubber, while the secondary tension stresses resulting do not materially affect the durability of the unit.

One practical problem in connection with the manufacture of these components is that the rubber must be vulcanized or cured, and the hollow tubular elements, together with this flat slab shape, provide for very good heat transfer to all sections of the rubber, facilitating the uniform vulcanization of the entire mass of the rubber. If it is important in any specific application to provide for corrosion resistance of the entire component, the rubber may be molded in such a way that a flashing extends up to the ends of the tubular elements so that the steel outer perimeter is entirely protected and made substantially corrosion resistant.

Figure 7:
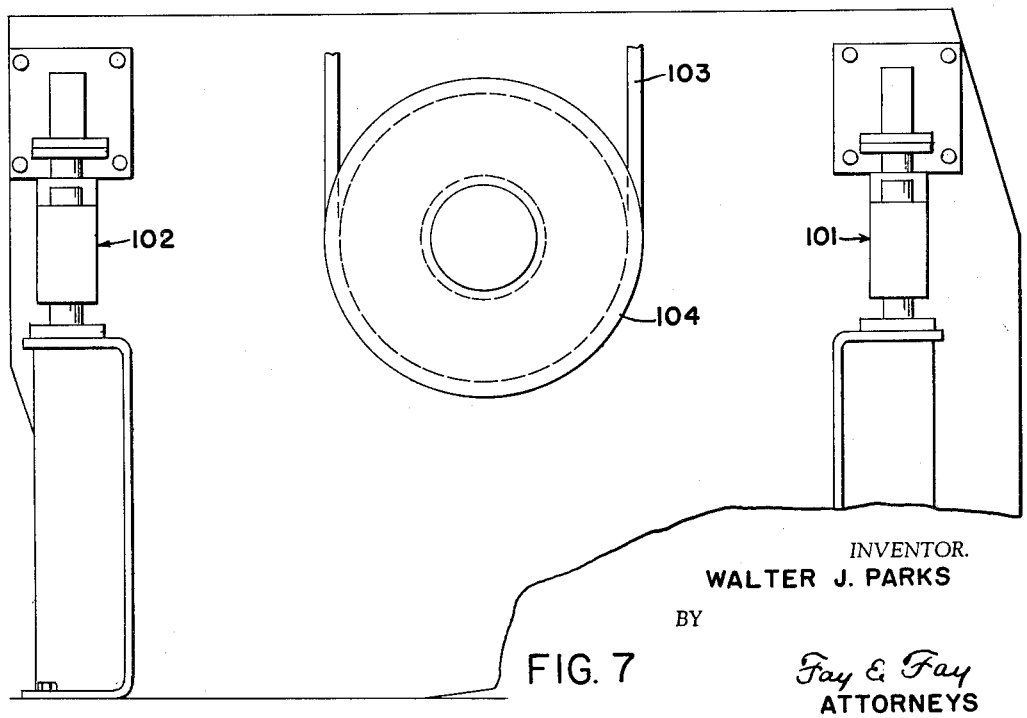
FIG. 7 is a side view of a modification of FIG. 2, showing a two bearing screen.

This invention is particularly useful in connection with gyratory or circular movement type vibrating screening equipment. Its special properties, however, may recommend its use in reciprocating screening equipment. In this type of equipment large amplitudes of movement are employed, and the gravity loads to be supported are large and the frequency is moderately high. Special problems are also encountered in the so-called unbalanced or two bearing screen seen in connection with FIG. 7 where the two support elements are seen at 101 on the right and 102 on the left with the belt drive shown at 103 and the sheave or pulley at 104. The reactions caused by the deflection of these resilient supports on the supporting structure are in this case unbalanced and on their magnitude depends the amount of vibration that might be set up in any supporting structure susceptible to it. The smaller the load per unit deflection, the less is the transmissibility of the vibration.

As stated earlier, the spring rate or load per unit deflection is a direct function of the cross-sectional area of the rubber between the tubular support elements and the modulus of the rubber and an inverse function of the thickness or length of the rubber components between tubular support elements. The cross-sectional area is in general determined by the maximum load to be carried and the maximum allowable stress of the rubber selected. The modulus of the rubber can be varied within certain limits to help meet the desired flexibility. But in general the most effective way of decreasing the stiffness of the unit is to increase the length of the unit from supporting point to supporting point. However, there is a practical limit to the length that may be used and retain stability in the mounting under the loaded condition. In general, it is held that this length shall not exceed the smallest dimension, length or width, of the cross-sectional area. The application of this rule to a cross section, as before described of 3½" x 6", would limit the length of rubber elements between plates, as in conventional design, to 3½". In this unit, however, due to the curved contour of the tubular elements, wherein the shortest length of rubber element is 3¼" and the longest approximately 5¼" for an average effective length of approximately 4¼", this previously allowable length of 3½" is increased approximately 30% and the unit is correspondingly more flexible and has proven very stable. The stability is imparted to the unit by the shorter and more highly stressed areas in the center of the rubber and it has previously been shown how these more highly stressed areas are buttressed and protected from failure by adjacent lower stressed rubber. As also explained earlier in connection with the example, the elastomeric material causes a shifting of the rubber around the outer tubular elements compressing the elastomer around the tubular element and providing what is called a yieldable abutment. The flow of rubber around the tubular element transfers a considerable part of load back around these elements and thus distributes the stress over a larger area than that of the confronting surfaces and makes a more reliable and durable unit.

Although the present invention has been described in connection with a few preferred embodiments thereof, variations and modifications in its structure and application may be resorted to by those skilled in the art without departing from the principles of the invention. All of these variations and modifications are considered to be within the true spirit and scope of the present invention as disclosed in the foregoing description and defined by the appended claims.

I claim:

1. In a vibrating screening apparatus, a vibratory body, a supporting stationary frame, means for oscillating said vibratory body relative to the stationary frame, support means for the vibratory body comprising a resilient member adapted to support the vibratory body to permit a relatively resilient connection to the supporting frame, said resilient connection comprising a plurality of tubular members, one of said members being attached to the supporting frame and one to the vibratory screen body, each of said members being mounted vertically substantially in parallel in a mass of elastomeric material, said elastomeric material under compression surrounding the tubular members, said tubular members being securely bonded to the elastomer and providing for a substantial thickness of elastomeric material to support the load of the vibratory body in shear and substantial compression, whereby the resilient means provides a new and improved connection therebetween.

2. In a vibrating screening apparatus, a vibratory body, a supporting stationary frame, means for oscillating said vibratory body relative to the stationary frame, support means for the vibratory body comprising a resilient member adapted to support the vibratory body to permit a relatively resilient connection to the supporting frame, said resilient connection comprising at least two tubular members, one of said members being attached to the supporting frame and one to the vibratory screen body, each of said members being mounted vertically substantially in parallel in a mass of elastomeric material, said elastomeric material surrounding the tubular members, said tubular members being securely bonded to the elastomer and providing for a substantial thickness of elastomeric material to support the load of the vibratory body; said resilient connection further being characterized by one of the tubular members, providing for a rounded surface of contact with the elastomeric material with a minimum distance between the interior portions of the tubular members and a maximum distance between the outer portions of the tubular members with the elastomer surrounding the tubular connections to provide a zone of elastomer supporting the more highly stressed elastomer between the tubular members, said resilient connection further being characterized by a yieldable abutment, wherein the elastomer flows around the tubular members under stress to reduce the stress concentrations at the bond between the elastomer and the tubular members.

3. The vibratory screen body of claim 2 in which the resilient connection comprises three tubular members within a block of elastomer, two of said members being attached to a stationary frame and one to the screen body, and in which the screen body attachment is between the other supports and positioned above so that the block of elastomer is in the shape of a chevron surrounding the tubular connections.

4. In a vibrating screening apparatus, a stationary base support, a vibrating screen body, means for oscillating said vibrating screen body relative to said stationary base frame, support means for the vibrating screen body comprising resilient members adapted to support said vibrating screen body to permit a resilient connection to the supporting frame, said resilient connection comprising a plurality of tubular members, said members being attached, one to the base frame and one to the screen body, said screen body tubular member being positioned above the other, each of said members being mounted in parallel in a mass of elastomeric material, said elastomeric material surrounding the tubular bodies, said tubular bodies being securely bonded to the elastomer and providing for a substantial thickness of elastomeric material to support the load of the vibrating screen body in shear and substantial compression.

5. In a vibrating screening apparatus, a stationary base support, a resiliently supported vibrating screen body for treating materials, oscillatory means for vibrating said screen body relative to the base support, further resilient supporting means for the oscillatory means, said latter resilient supporting means constituting floating supports for the oscillatory means and the vibrating screen body, means out of phase with respect to the oscillatory means for engaging said resilient supporting means, said oscillatory means and out of phase means adapted to drive the supporting means out of phase with the movement of the screen body to reduce the vibration to surrounding structures, each of said resilient means supporting the oscillatory means and screen body comprising a plurality of tubular connections, including at least one to the stationary base and one to the moving portion, each of said tubular connections being substantially mounted in parallel within a mass of elastomeric material in shear and substantial compression, said elastomeric material surrounding the tubular body, whereby the resilient means provides a new and improved connection therebetween.

6. In a vibratory screening apparatus, a stationary base support, a vibrating screen body, means for oscillating said vibrating screen body relative to said stationary base frame, support means for the vibrating screen body comprising resilient members adapted to support said vibrating screen body to permit a resilient connection to the supporting frame, said resilient connection comprising at least three tubular members, at least one of said members being attached, one to the base frame and one to the screen body, said screen body tubular member being positioned above the other, each of said members being mounted in parallel in a mass of elastomeric material, said elastomeric material surrounding the tubular bodies, said tubular bodies being securely bonded to the elastomer and providing for a substantial thickness of elastomeric material to support the load of the vibrating screen body in shear.

References Cited in the file of this patent

UNITED STATES PATENTS

| | | |
|---|---|---|
| 2,212,550 | Parks | Aug. 27, 1940 |
| 2,260,386 | Krohn | Oct. 28, 1941 |
| 2,284,692 | Strube | June 2, 1942 |
| 2,355,891 | Parks | Aug. 15, 1944 |
| 2,729,332 | Gruner | Jan. 3, 1956 |

FOREIGN PATENTS

| | | |
|---|---|---|
| 449,515 | Canada | Oct. 9, 1945 |
| 612,396 | Great Britain | Nov. 11, 1948 |